United States Patent
Shah et al.

(10) Patent No.: US 10,151,383 B2
(45) Date of Patent: Dec. 11, 2018

(54) BRAZE RETENTION FEATURE FOR A CARRIER ASSEMBLY

(71) Applicant: Toyota Motor Engineering & Manufacturing North America, Inc., Erlanger, KY (US)

(72) Inventors: Shail N. Shah, Ann Arbor, MI (US); Shinji Oita, Ann Arbor, MI (US)

(73) Assignees: Toyota Motor Engineering & Manufacturing North America, Inc., Plano, TX (US); AISIN AW Co., Ltd., Anjo-shi, Aichi-Ken (JP)

( * ) Notice: Subject to any disclaimer, the term of this patent is extended or adjusted under 35 U.S.C. 154(b) by 161 days.

(21) Appl. No.: 15/219,424

(22) Filed: Jul. 26, 2016

(65) Prior Publication Data

US 2018/0031114 A1    Feb. 1, 2018

(51) Int. Cl.
*F16H 57/08* (2006.01)
*F16H 57/10* (2006.01)

(52) U.S. Cl.
CPC .......... *F16H 57/082* (2013.01); *F16H 57/10* (2013.01)

(58) Field of Classification Search
None
See application file for complete search history.

(56) References Cited

U.S. PATENT DOCUMENTS

| | | |
|---|---|---|
| 3,939,736 A | 2/1976 | Morin |
| 4,838,123 A | 6/1989 | Matoba |
| 5,098,358 A | 3/1992 | Igaku |
| 5,382,203 A | 1/1995 | Bellman et al. |
| 6,863,636 B2 | 3/2005 | Huber et al. |
| 7,033,301 B2 | 4/2006 | Kimes |
| 7,556,583 B2 | 7/2009 | Wang et al. |
| 8,042,247 B2 | 10/2011 | Dunkle et al. |
| 8,187,141 B2 | 5/2012 | Goleski |
| 8,491,439 B2 | 7/2013 | Kimes et al. |
| 8,491,440 B2 | 7/2013 | Kimes et al. |
| 8,523,550 B2 | 9/2013 | Wehrli et al. |

(Continued)

FOREIGN PATENT DOCUMENTS

| | | |
|---|---|---|
| JP | 2007268575 A | 10/2007 |
| JP | 2016003676 A | 1/2016 |

(Continued)

*Primary Examiner* — Justin Holmes
(74) *Attorney, Agent, or Firm* — Christopher G. Darrow; Darrow Mustafa PC

(57) ABSTRACT

A planetary carrier assembly is provided for a transmission. The carrier assembly comprises a powder metal carrier member including a carrier plate having a plurality of carrier legs extending from the carrier plate, and a powder metal cover member including a cover plate having a plurality of cover legs extending from the cover plate. The carrier assembly includes a sleeve member defining a plurality of braze material retention features stamped along a perimeter of the sleeve member. In various aspects, the braze material retention features cooperate with the carrier member and the cover member, in an assembled state, to define retention apertures shaped and sized to retain a braze material adjacent the single plane prior to a sintering process. A portion of the carrier member is aligned with both a portion of the cover member and a portion of the sleeve member, and brazed together in a single plane.

19 Claims, 9 Drawing Sheets

(56) References Cited

U.S. PATENT DOCUMENTS

| | | |
|---|---|---|
| 8,574,119 B1 | 11/2013 | Kinter |
| 8,961,359 B2* | 2/2015 | Floro ............... F16D 13/76 |
| | | 475/159 |
| 9,034,246 B2 | 5/2015 | Voice |
| 9,121,276 B2 | 9/2015 | Heidecker et al. |
| 9,273,737 B2 | 3/2016 | Heuver et al. |
| 2004/0077455 A1* | 4/2004 | Huber ............... F16H 57/082 |
| | | 475/331 |
| 2004/0235610 A1 | 11/2004 | Jang et al. |
| 2006/0275607 A1 | 12/2006 | Demir et al. |
| 2007/0081915 A1 | 4/2007 | Trasorras et al. |
| 2009/0062058 A1 | 3/2009 | Kimes et al. |
| 2010/0105515 A1* | 4/2010 | Goleski ............ F16H 57/082 |
| | | 475/341 |
| 2012/0003443 A1 | 1/2012 | Gubanich et al. |
| 2013/0252012 A1 | 9/2013 | Cooper et al. |
| 2015/0047942 A1 | 2/2015 | Kimes et al. |
| 2015/0061188 A1 | 3/2015 | Hasegawa et al. |
| 2015/0314547 A1 | 11/2015 | Grobl et al. |
| 2015/0367414 A1 | 12/2015 | Kronberger |
| 2016/0061315 A1 | 3/2016 | Taylor et al. |
| 2016/0107235 A1 | 4/2016 | Wilkinson |
| 2017/0252844 A1 | 9/2017 | Hirono et al. |

FOREIGN PATENT DOCUMENTS

| | | |
|---|---|---|
| JP | 2016003672 | 12/2016 |
| JP | 2016003676 | 12/2016 |
| WO | 2013088860 A1 | 2/2015 |

* cited by examiner

BRAZE RETENTION FEATURE FOR A CARRIER ASSEMBLY

TECHNICAL FIELD

The present disclosure generally relates to a planetary carrier assembly for a transmission, and more specifically, to braze material retention apertures formed in the assembled carrier assembly, as well as methods for making the same.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Transmission components must be high strength and suitable for high torque capacities. Powder metal transmission components provide several technical benefits, and are becoming more attractive from manufacturing strategies and perspectives. Typical powder metal carrier structures may include three or more pieces in order to accommodate the various pinion gears and related components. The pieces may include a cylindrical shell or drum, one or more support member, a backing plate, and various other optional or auxiliary-type structures. The various powder metal transmission components may be sintered and/or brazed together. Brazing techniques may require the careful placement of braze material to ensure equal satisfactory connection between the parts after sintering. Further, the transmission components may require pre-sintering machining.

Generally, reducing the need for machining of parts in any assembly reduces part production costs, and the time required for manufacturing. Specifically, with respect to powder metal, the green components are fragile prior to sintering. Thus, a reduction in the need for machining green powder metal components not only reduces machining costs and manufacturing time, but also reduces part handling, which can reduce any risk of breakage, quality issues, or defects.

Accordingly, there remains a need for an improved powder metal carrier assembly that provides strength and ease of manufacture, with the ability to meet the high torque requirements needed for use in a transmission.

SUMMARY

This section provides a general summary of the disclosure, and is not a comprehensive disclosure of its full scope or all of its features.

In various aspects, the present teachings provide a planetary carrier assembly for a transmission. The carrier assembly comprises a powder metal carrier member including a carrier plate having a plurality of carrier legs integral with and extending a distance from the carrier plate, and a powder metal cover member including a cover plate having a plurality of cover legs integral with and extending a distance from the cover plate. The carrier assembly may also include a steel sleeve member defining a plurality of braze material retention features along an inner perimeter of the sleeve member. The carrier assembly is arranged such that a portion of the carrier member is aligned with and brazed to a portion of the cover member and a portion of the sleeve member, together in a single plane. In various aspects, the braze retention features of the sleeve member cooperate with the carrier member and the cover member, in an assembled state, to define retention apertures shaped and sized to retain a braze material adjacent the single plane prior to a sintering process.

In other aspects, the present teachings provide a planetary carrier assembly for a transmission. The carrier assembly may include a plurality of pinion gears. The carrier assembly includes a unitary, powder metal carrier member including a carrier plate having a plurality of integral carrier legs extending therefrom, and a unitary, powder metal cover member comprising a cover plate having a plurality of integral cover legs extending therefrom. A steel sleeve member is provided defining a plurality of braze material retention features along an inner perimeter of the sleeve member. The carrier assembly is arranged such that pairs of respective ends of the carrier legs and ends of the cover legs are aligned with the sleeve member and brazed together in a single plane, defining an interior of the carrier assembly configured to house plurality of pinion gears.

In still other aspects, the present teachings provide a method for assembling a planetary carrier assembly. The method includes aligning (1) a powder metal carrier member comprising a carrier plate having a plurality of carrier legs extending therefrom, (2) a steel sleeve member defining a plurality of braze material retention features along an inner perimeter of the sleeve member, and (3) a powder metal cover member comprising a cover plate having a plurality of cover legs extending therefrom. The alignment forms a subassembly with a portion of the carrier member being aligned with a portion of the cover member and a portion of the sleeve member together in a single plane. The method includes disposing a braze material within a plurality of retention apertures, adjacent the single plane. The method includes sintering the subassembly and forming a plurality of braze joints between the carrier member, the cover member, and the sleeve member in the single plane.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
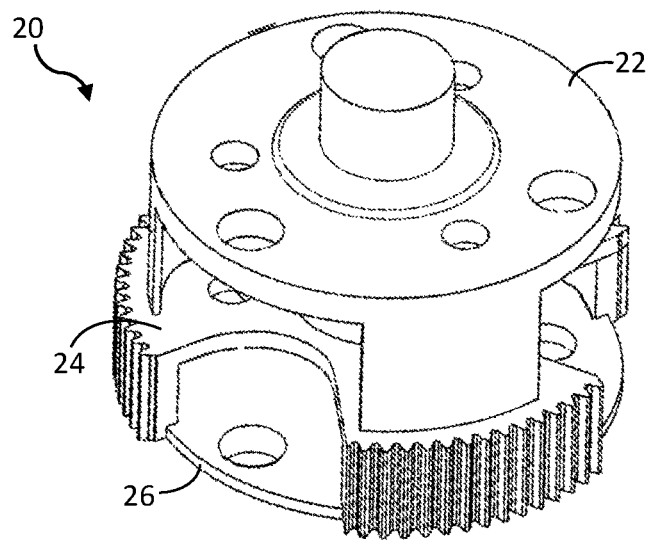
FIG. 1 is perspective view of an exemplary prior art, three-piece Ravigneaux carrier assembly.

It should be noted that the figures set forth herein are intended to exemplify the general characteristics of the methods and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides a planetary carrier assembly that may be used for accommodating various pinion gears and components of a transmission, and in particular, an automatic automobile transmission. In various aspects, the carrier assembly comprises two main sintered metal components. For example, the first main component of the carrier assembly may comprise a powder metal carrier member including a carrier plate having a plurality of carrier legs extending from the carrier plate. The second main component may comprise a powder metal cover member including a cover plate having a plurality of cover legs extending from the cover plate. The carrier assembly includes a sleeve member defining a plurality of braze material retention features along a perimeter of the sleeve member. In one example, the braze material retention features may be stamped into a steel sleeve member. In various aspects, the braze material retention features cooperate with the carrier member and the cover member, in an assembled state, to define retention apertures shaped and sized to retain a braze material adjacent the single plane prior to a sintering process. A portion of the carrier member, a portion of the cover member, and a portion of the sleeve member are aligned with and brazed together, preferably in a single plane.

In certain aspects, it may be desirable that the carrier assembly be generally arranged such that respective ends of the carrier legs and ends of the cover legs are aligned with and brazed to one another. In the various arrangements, joining the carrier member with the cover member defines an interior of the carrier assembly configured to house various pinion gears, and joining the sleeve member to the carrier assembly provides an attachment point for other components, such as brake hubs and other auxiliary members.

The present technology focuses, in part, on the formation of braze material retention apertures by using braze material retention features formed or stamped on the sleeve member. Retention features and retention apertures are used to locate and retain braze material, such as braze pellets, during sintering steps in the formation of powder metal components. Traditionally, there have been three common arrangements for the placement of braze material within structural components for sintering. For example, braze pellets may be placed within a machined retention feature, within a face-formed feature on a powder metal part, or within a through-hole feature typically made by using a core rod tool during the powder metal forming process, prior to sintering. For example, a core rod may be inserted in a cavity of a die, prior to the powder being added into the cavity, such that the powder is thereafter dispensed around the core rod. Each of the above options has potential drawbacks. First, machining is an additional process that can increase costs. Second, face-formed features should be in areas with a high thickness, and the parts may need to be flipped over after a braze pellet is placed therein, in order to induce proper capillary flow of braze material to the desired joint area during sintering. Third, core rod features are typically on low thickness sections of a part, which may limit design flexibility while increasing tooling complexity.

The present technology can be used with various planetary gear trains and assemblies, including Ravigneaux planetary gear structures. By way of background, Ravigneaux planetary gear structures can be used in automatic transmissions to achieve a variety of gear ratios, and may include two tiers, or decks, of pinion gears that share a common carrier. FIG. 1 is perspective view of an exemplary prior art, three-piece Ravigneaux carrier assembly 20. As shown, the typical prior art carrier assembly 20 generally includes a support member 22, a cylindrical shell or drum 24, and a backing, or end plate 26.

The present technology provides the use of a plurality of braze material retention features that are formed in a sleeve member, for example, by stamping. The shaped retention features cooperate with other components of the carrier assembly to form braze material retention apertures. The braze material, such as braze pellets, can then be inserted into the apertures, and the assembly does not need to be flipped over in order to induce capillary flow during the sintering step. As will be described in more detail below, the present technology can provide at least two braze joint component connections with each braze material retention aperture. For example, in various aspects, the present technology provides an accommodation of the two decks of gears by using a two-piece powder metal carrier assembly. Each braze material retention aperture preferably serves to create two braze joints, namely between the two powder metal components (carrier member and cover member), and between the carrier member and the sleeve member. In various other aspects, the sleeve member may also be connected to the cover member using the same braze joint, and preferably in the same plane. As such, the present technology reduces, among other things, manufacturing costs and production time, while increasing the ability to create consistent braze joints.

Figure 2:
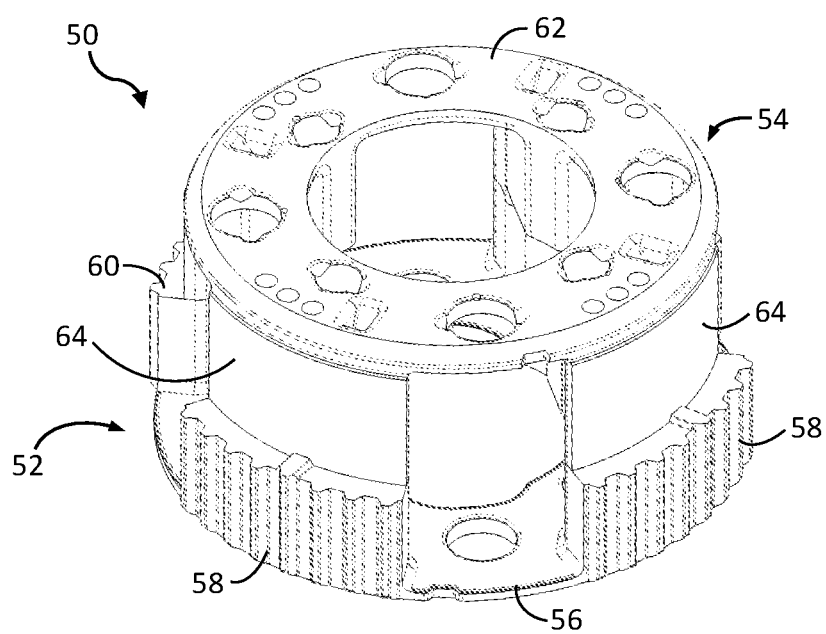
FIG. 2 is a perspective view of a Ravigneaux carrier assembly with a carrier member secured to a cover member according to various aspects of the present disclosure.

FIG. 2 is a perspective view of an exemplary two-piece Ravigneaux carrier assembly 50 with a powder metal carrier member 52 secured to a powder metal cover member 54 according to various aspects of the present disclosure.

In various aspects, the carrier member 52 may be a unitary, monolithic component (i.e., formed as one component), and includes a substantially circular carrier plate 56 portion including a plurality of angularly spaced-apart carrier legs 58 integral with the carrier plate 56. The carrier legs 58 may be provided with a substantially uniform length, extending to a free end 60. For example, a distance between an outer face 56*a* (see, FIG. 9) of the carrier plate 56 and the free end 60 of the carrier leg 58 may generally be the same for each spaced-apart carrier leg 58. Similar to the shape and design of the carrier plate 52, in various aspects, the cover member 54 may be a unitary, monolithic component (i.e., formed as one component), and includes a substantially circular cover plate 62 including a plurality of angularly spaced-apart cover legs 64 integral with the cover plate 62. The cover legs 64 may be provided with a uniform length, extending to a free end 66. For example, a distance between an outer face 62*a* (see, FIG. 7) of the cover plate 62 and the free end 66 of the cover leg 64 may generally be the same for each spaced-apart cover leg 64. The two-piece carrier assembly 50 is generally arranged such that respective ends 60 of the carrier legs 58 and ends 66 of the cover legs 64 are, at least partially, aligned with and secured to one another. In various aspects, the respective ends are joined together by braze joints that, by way of non-limiting example, can be formed during a sintering process using suitable brazing material. The arrangement of the carrier member 52 and the cover member 54 defines an interior 80 (see, FIGS. 5A, 5B) of the carrier assembly 50 configured to house various pinion gears and related components.

It should be understood that FIG. 2, and its related description, is with respect to one presently chosen embodiment, and various changes can be made to the design without impacting the overall function, purpose, and operation. In certain aspects, for example, the legs may have unequal sizes, shapes, and/or lengths, in whole or in part, but still form a two-piece carrier assembly. Further, although it may be preferable that the carrier member 52 and cover member 54 be monolithic, unitary components, there may be certain desirable aspects where at least a portion of the carrier member 52 or cover member 54 comprises two or more components mechanically (or otherwise) fastened, secured, or joined together.

Powder metallurgy techniques cover a wide range of ways in which materials or components are made from metal powders. As such, the powder metal compositions of the present technology can be tailored to specific or desired end uses. In various aspects, the carrier member 52 and the cover member 54 can comprise the same or substantially similar powder metal composition. In other aspects, it may be desirable that the carrier member 52 and the cover member 54 have different powder metal compositions.

In various aspects, it may be desirable for the carrier assembly 50 to also include auxiliary components that cooperate with functions of an automotive transmission. Non-limiting examples of auxiliary components may include sleeves, brake hubs, clutches, one way clutches, races, bearings, etc. Thus, the carrier assembly 50 may include at least one auxiliary component secured to one or both of the carrier member 52 and the cover member 54. It should be understood that an auxiliary component can include a plurality of parts or combined components. In certain aspects, the auxiliary member can be attached using a braze joint or weld.

Figure 3A:
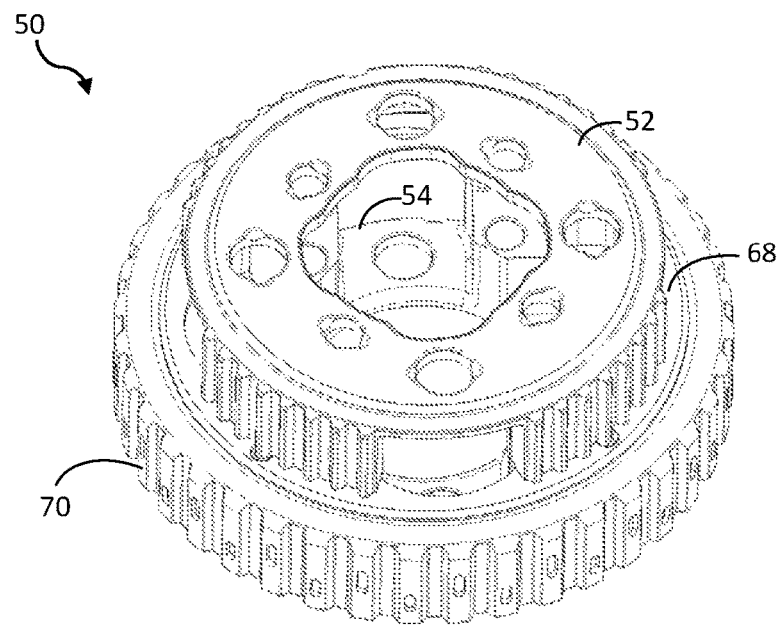
FIG. 3A is a first perspective view of the carrier assembly of FIG. 2, further including a sleeve member and brake hub.
Figure 3B:
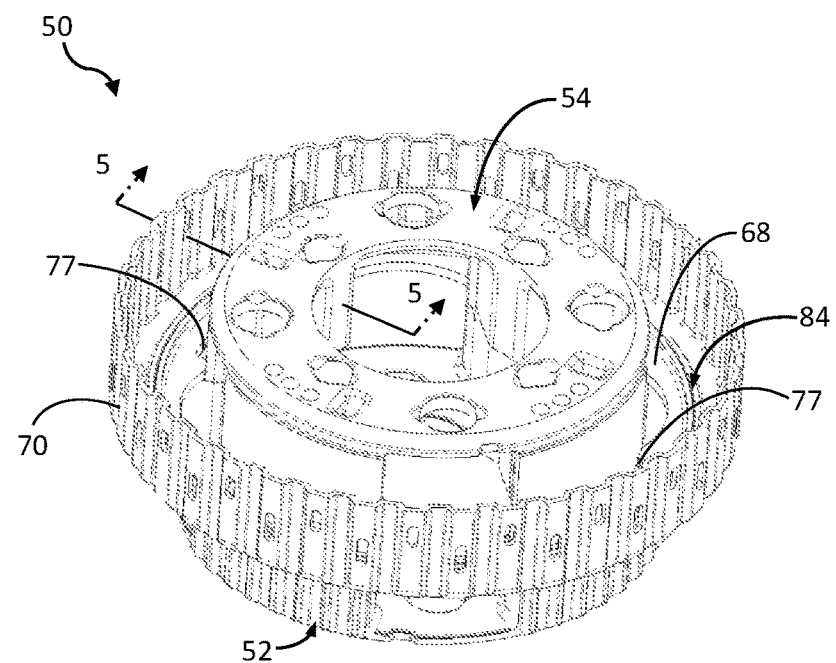
FIG. 3B is a second perspective view of the carrier assembly of FIG. 2, further including a sleeve member and brake hub.
Figure 4:
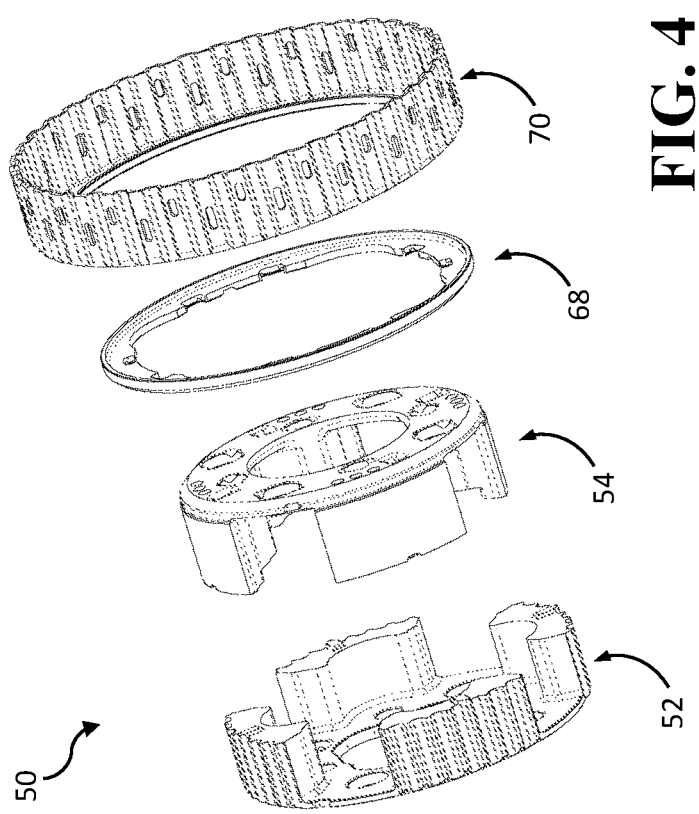
FIG. 4 is an exploded perspective view of the Ravigneaux carrier assembly of FIGS. 2 and 3.

FIG. 3A is a first perspective view of the carrier assembly 50 of FIG. 2 further including an annular sleeve member 68 and an annular brake hub 70, shown with the carrier member 52 facing an upward direction. FIG. 3B is a second perspective view of the carrier assembly 50 of FIG. 2 further including the sleeve member 68 and the brake hub 70, shown with the cover member 54 facing an upward direction. FIG. 4 is an exploded perspective view of the Ravigneaux carrier assembly 50 of FIGS. 2 and 3.

Figure 5A:
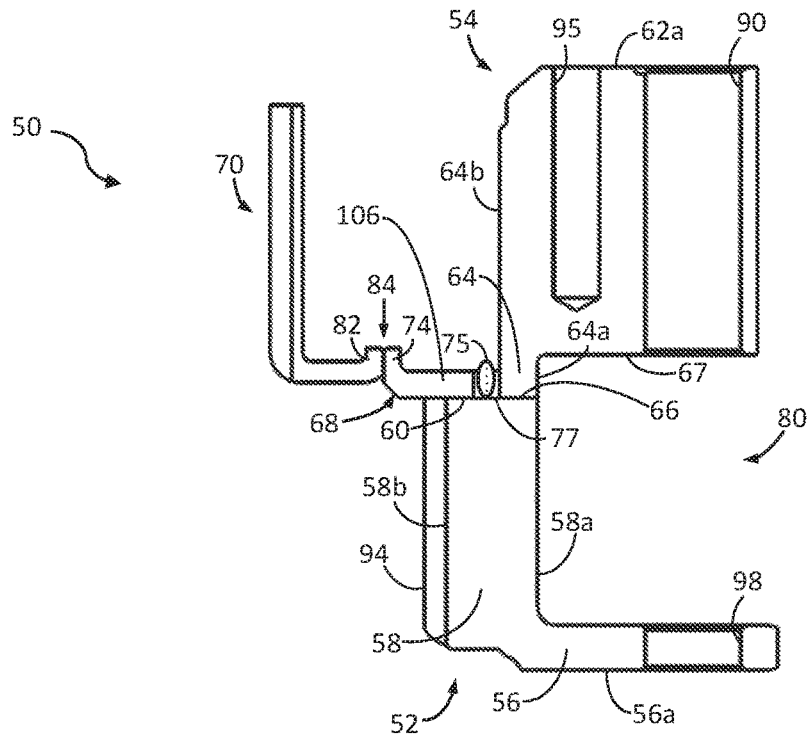
FIG. 5A is a partial cross-sectional view of FIG. 3B taken along the line 5-5 and showing a braze pellet retained within a braze material retention aperture prior to sintering.
Figure 5B:
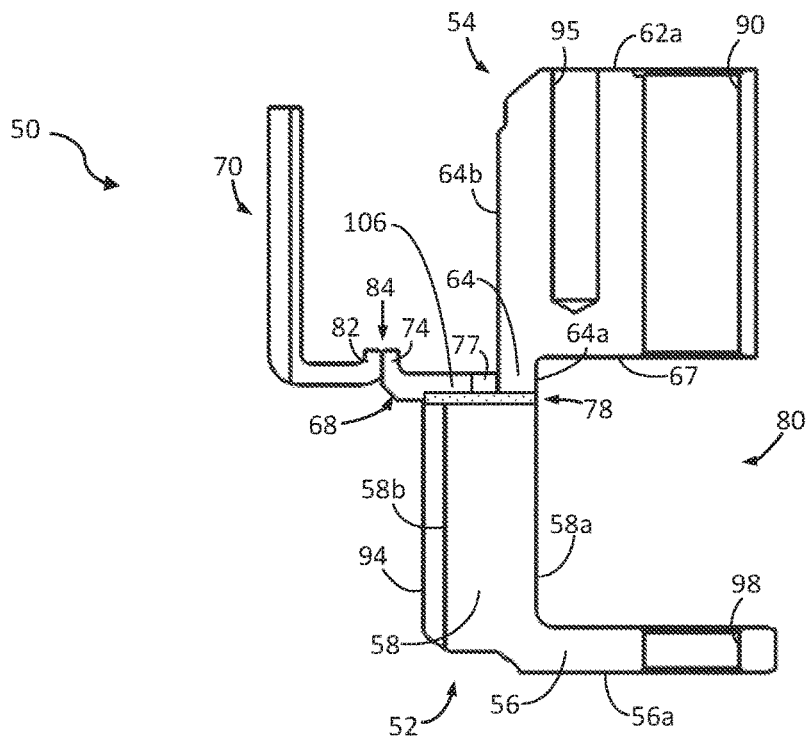
FIG. 5B illustrates the partial cross-sectional view of FIG. 5A after a sintering process.

In various aspects, the sleeve member 68 can be secured to the carrier assembly by a braze joint or weld. When using a braze joint, the sleeve member 68 should be able to generally withstand the temperatures of a sintering process. FIG. 5A is a partial cross-sectional view of FIG. 3B taken along the line 5-5, showing additional details of the carrier assembly 50, including an exemplary braze material, such as a braze pellet 75, located and retained within a braze material retention aperture 77 prior to sintering. FIG. 5B illustrates the partial cross-sectional view of FIG. 5A after a sintering process, with the braze material dispersed by capillary action forming a braze joint 78 between a portion of the carrier member 52, a portion of the cover member 54, and a portion of the sleeve member 68. Although FIG. 5A illustrates the brake hub 70 for completeness, the brake hub 70, or any other auxiliary member, may be attached after the sintering process.

As detailed in FIGS. 5A and 5B, at least a portion of an area 106 adjacent an inner perimeter 72 of the steel sleeve member 68 is secured to the carrier assembly 50 adjacent the free ends 60, 66 of the respective carrier legs 58 and cover leg 64. Thus, the carrier member 54 is joined to a portion of both the sleeve member 68 and the cover member 54. As shown, the respective ends 60 of the carrier legs 58 and ends 66 of the cover legs 64 are aligned with and secured to one another by respective braze joints 78 disposed in a single plane. In certain aspects, the auxiliary component, here the steel sleeve member 68, may also secured to the carrier assembly 50 with the braze joint 78 in the same single plane. As shown, the respective carrier leg 58 and cover leg 64 define respective inner surfaces, or walls 58*a*, 64*a* that may be aligned substantially flush with one another, and respective outer surfaces, or walls 58*b*, 64*b*, that may be offset from one another at the location of the braze plane, which may provide a suitable joining surface for the auxiliary member.

In certain aspects, at least one of the carrier legs 58 and cover legs 64 may also define a braze material retention feature (not shown) in which a suitable braze material can be placed prior to the sintering. For example, the end 60 of the carrier leg 58 or the end 66 of the cover leg 64 may include a small aperture or bore defined therein, suitable for holding the braze material in place. In other aspects, another auxiliary member may additionally or alternatively provide suitable braze material retention features. In still other aspects, portions of the legs 58, 64 may be shaped to guide a braze material to the appropriate joint area during a sintering process.

The arrangement of the carrier member 52 and the cover member 54 at least partially defines an interior cavity 80 within the carrier assembly 50 configured to house a plurality of pinion gears and various other related components. It should be understood that the shapes of the carrier member 52 and cover member 54 may include many variations. For example, while the bottom of the cover member 54 is shown defining two substantially parallel planes 66, 67, in certain designs, there may be only one plane such that the free end 66 is aligned with plane 67. In various aspects, the carrier assembly 50 may include four spaced-apart cover legs 64 joined to a respective set of four spaced-apart carrier legs 58. As shown in FIGS. 5A and 5B, an inner perimeter 82 of the annular brake hub 70 may be secured to an outer perimeter 74 of the steel sleeve member 68, for example, with a weld joint 84 or equivalent fastening mechanism. In certain aspects, the steel sleeve member 68 may be re-shaped and/or press-fit with the brake hub 70 after the sintering process, and the two components may then be welded to one another to create the assembly.

Figure 6A:
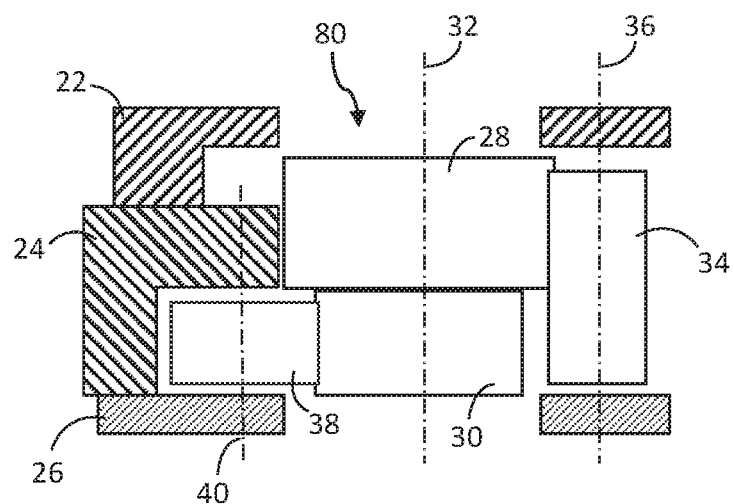
FIG. 6A is a schematic view representing a partial cross-sectional view of the prior art three-piece Ravigneaux assembly of FIG. 1.
Figure 6B:
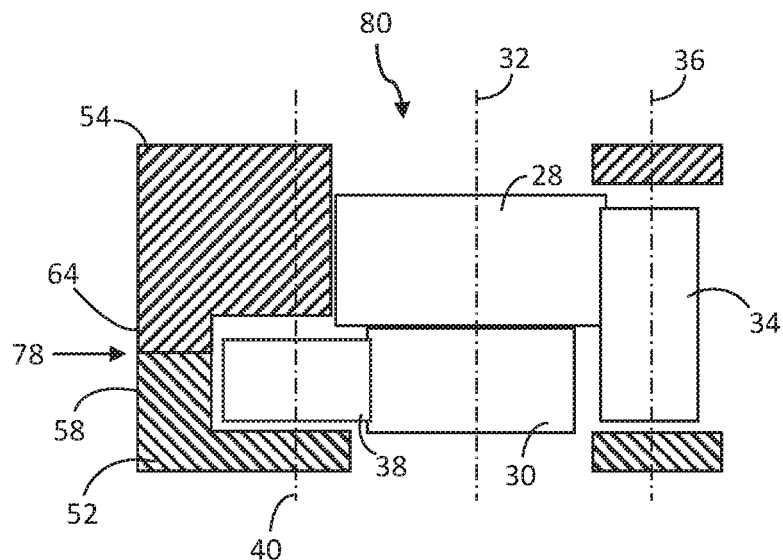
FIG. 6B is a schematic view representing a partial cross-sectional view of the two-piece Ravigneaux carrier assembly of FIG. 2 according to various aspects of the present disclosure.

FIG. 6A is a schematic view representing a partial cross-sectional view of the three-piece prior art Ravigneaux assembly of FIG. 1. For comparison purposes, FIG. 6B is a schematic view representing a partial cross-sectional view of the two-piece Ravigneaux carrier assembly of FIG. 2, according to the present disclosure. Both schematic representations illustrate a configuration with the same large sun gear 28 and small sun gear 30, sharing the same sun axis 36, as well as the same long pinion gear 34 on a long pinion axis 36, and short pinion gear 38 on a short pinion axis 40.

Figure 7:
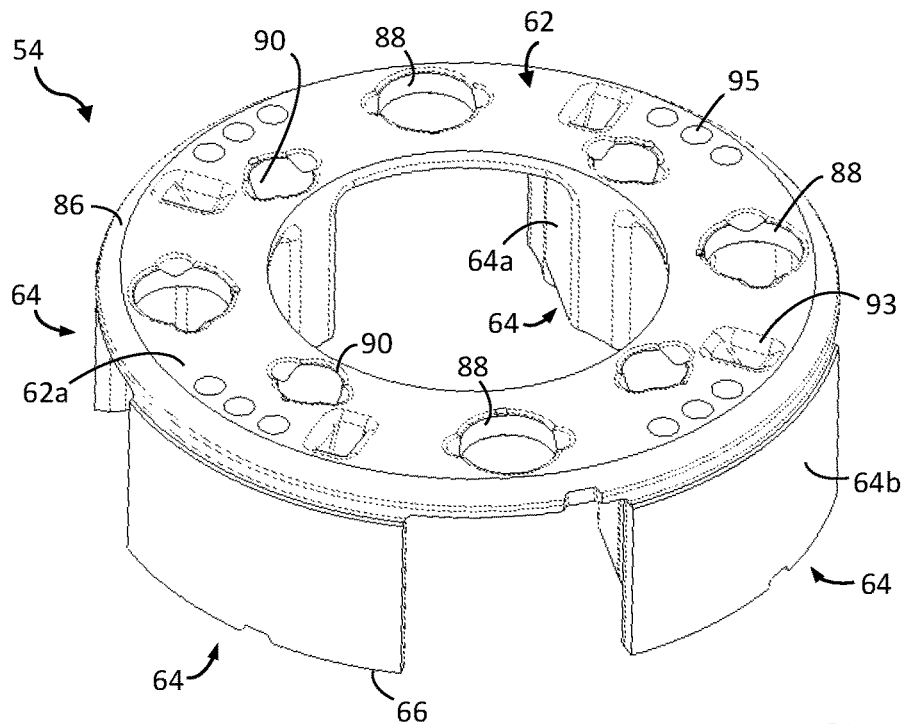
FIG. 7 is a perspective view of a powder metal cover member including a cover plate with integral cover legs extending therefrom.
Figure 8:
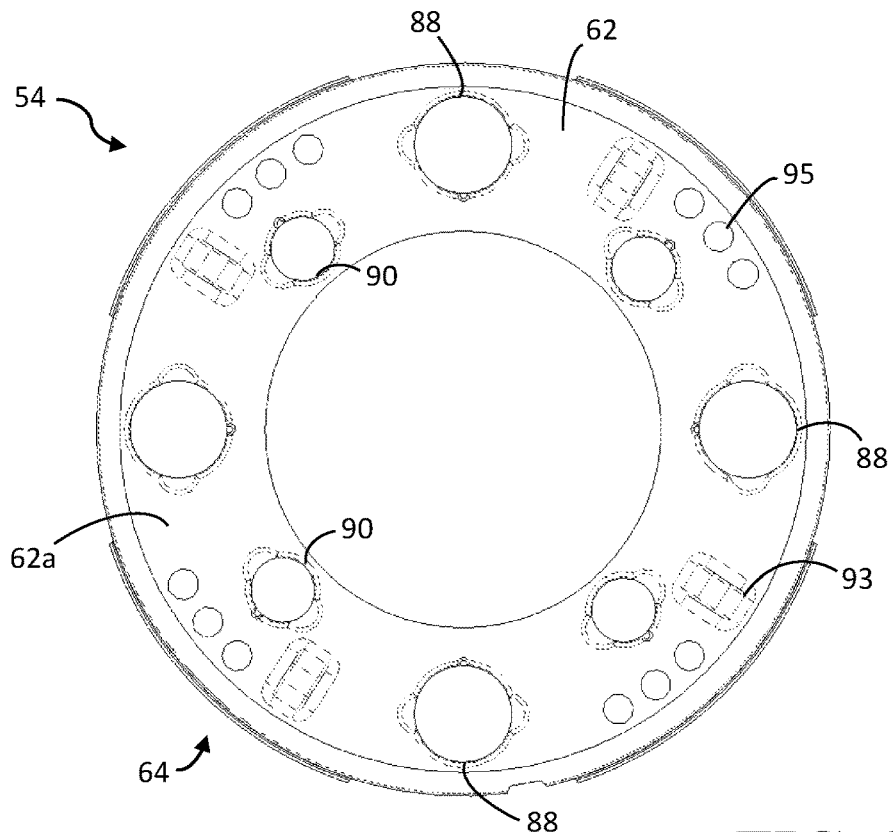
FIG. 8 is a top plan view of the powder metal cover plate member of FIG. 7.

FIG. 7 is a perspective view of an exemplary powder metal cover member 54 including a cover plate 62 portion with integral cover legs 64 extending therefrom, and FIG. 8 is a top plan view of the powder metal cover member 54 of FIG. 7. The cover plate 62 may be provided with a substantially circular shape having a flat web surface, or outer face 62a with a chamfered or curved edge 86. In various aspects, the curved edge 86 may be made by machining. The various inner walls 64a of the cover legs may be curved or shaped to accommodate the pinion gears and other components. The outer walls 64b of the legs 64 may be substantially aligned with the edge 86 of the outer face 62a. The cover plate 62 may be formed with various apertures and other features formed therein, either during the powder metal manufacturing process or machined thereafter. For example, a first plurality of angularly spaced-apart apertures 88 may be provided for the pinion shafts (not shown) of the long pinion gears 34. Similarly, a second plurality of angularly spaced-apart apertures 90 may be provided for the pinion shafts of the short pinion gears 38. As shown, the second plurality of apertures 90 extend through both the cover plate 62 as well as the cover legs 64, while the first plurality 88 of apertures extend through the cover plate 62 portion only. Additional retention features such as apertures 93, 95 may also be provided. It should be understood that other configurations of the cover member 54 may also be used, depending on the desired design.

Figure 9:
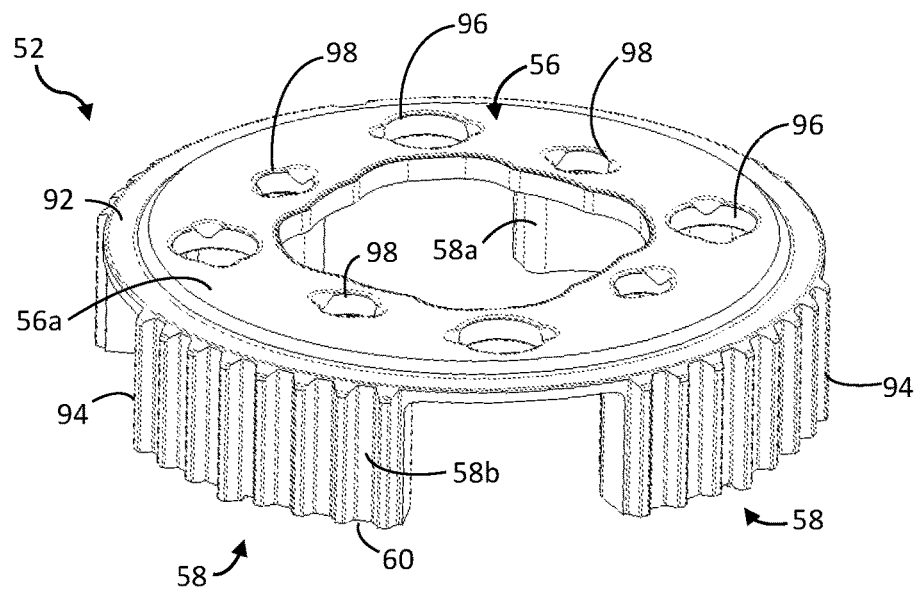
FIG. 9 is a perspective view of a powder metal carrier member including a carrier plate with integral carrier legs extending therefrom.
Figure 10:
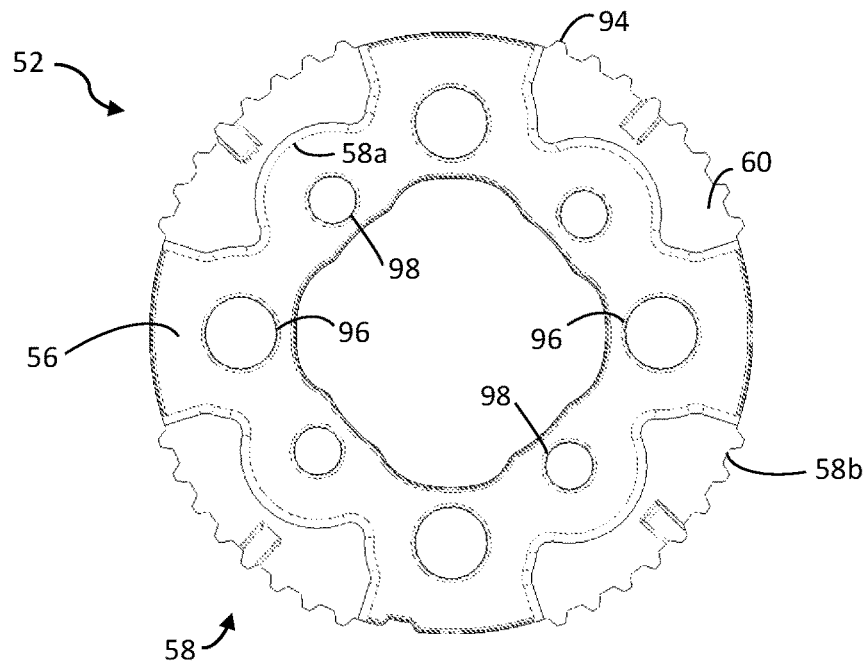
FIG. 10 is a bottom plan view of the powder metal carrier member of FIG. 9.

FIG. 9 is a perspective view of an exemplary powder metal carrier member 52 including a carrier plate 56 portion with integral carrier legs 58 extending therefrom, and FIG. 10 is a bottom plan view of the powder metal carrier member 52 of FIG. 9. The carrier plate 56 may be provided with a substantially circular shape having a flat web surface, or outer face 56a with a lowered or beveled edge 92. In various aspects, the edge 92 may be made by machining. The various inner walls 58a of the carrier legs 58 may be curved or shaped to accommodate the pinion gears and other components. The outer walls 58b of the legs 58 may be substantially aligned with the edge 92 of the outer face 56a, and optionally include spaced-apart splines 94. The carrier plate 56 may be formed with various apertures and other features formed therein, either during the powder metal manufacturing process or machined thereafter. For example, a first plurality of angularly spaced-apart apertures 96 may be provided for the pinion shafts (not shown) of the long pinion gears 34. Similarly, a second plurality of angularly spaced-apart apertures 98 may be provided for the pinion shafts of the short pinion gears 38. As shown, the first and second pluralities of apertures 96, 98 only extend through the carrier plate 56, as the inner walls 58a of the carrier legs 58 are shaped around the second plurality of apertures 98. It should be understood that other configurations of the carrier member 52 may also be used, depending on the design.

Figure 11:
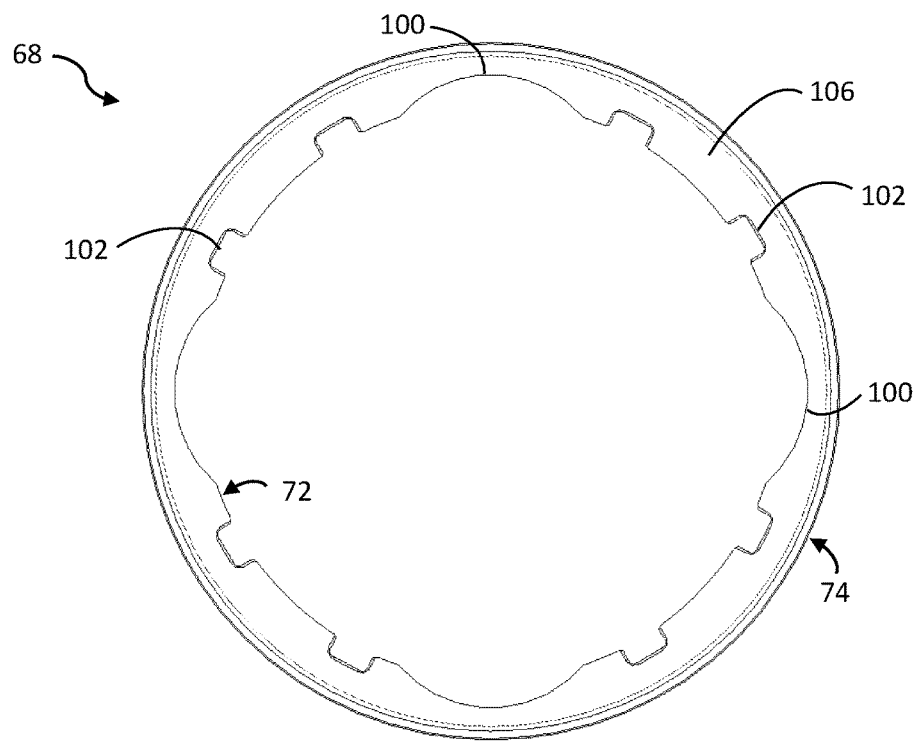
FIG. 11 is a top plan view of an exemplary sleeve member according to various aspects of the teachings of the present disclosure.
Figure 12:
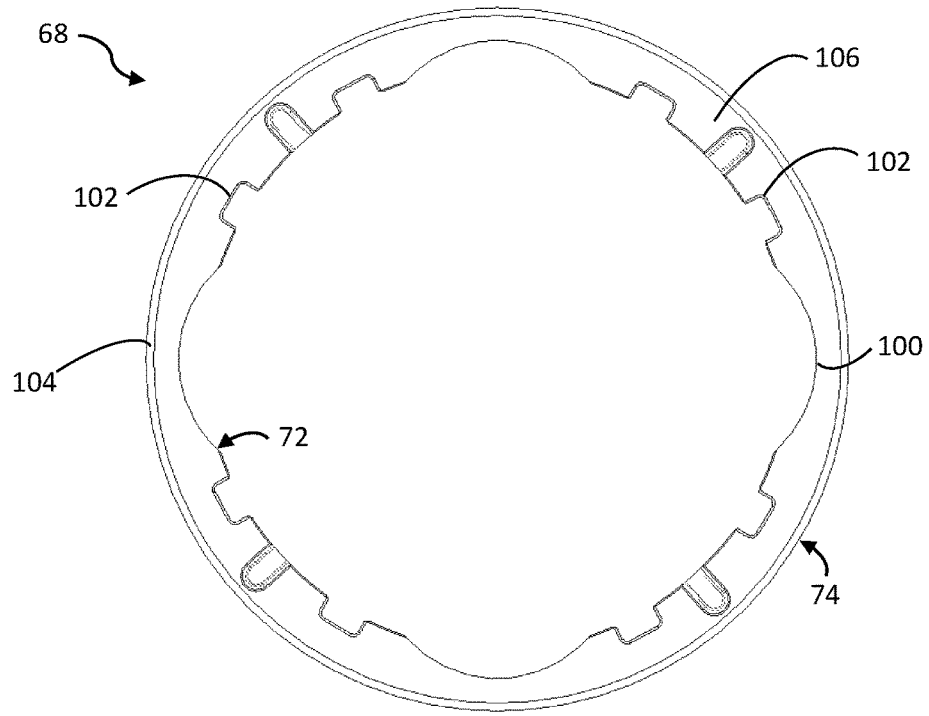
FIG. 12 is a bottom plan view of the exemplary sleeve member of FIG. 11.
Figure 13:
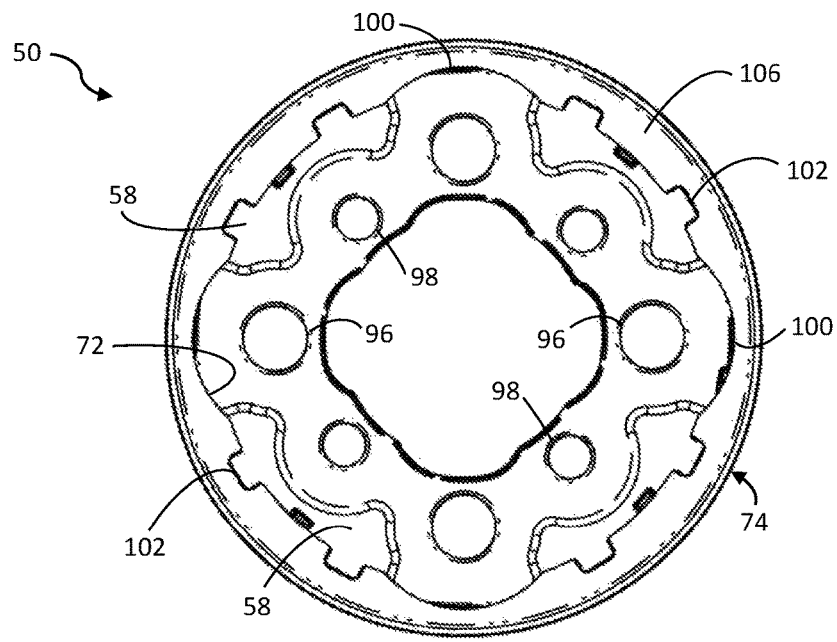
FIG. 13 is a bottom plan view of the powder metal carrier member of FIG. 9, further including a sleeve member.
Figure 14:
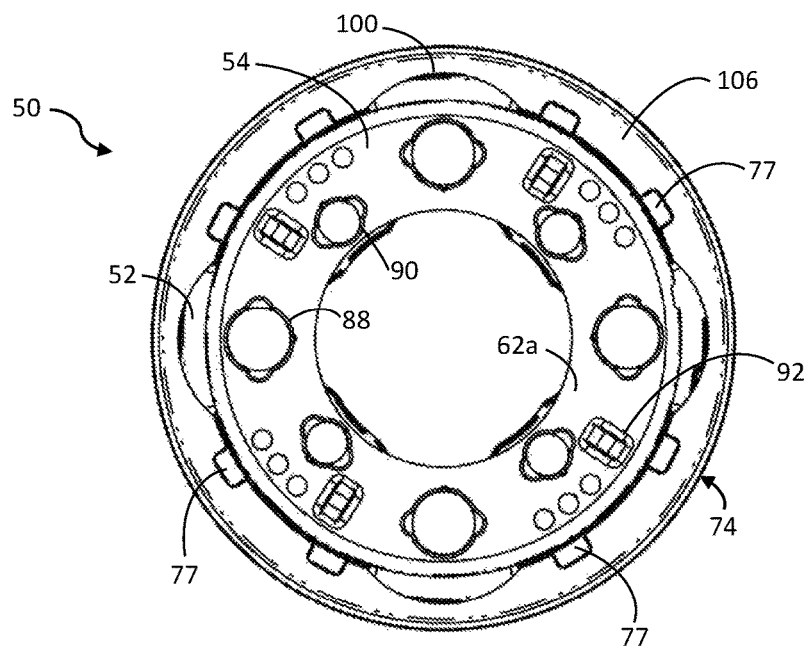
FIG. 14 is a bottom plan view of the assembly of FIG. 13, further including a cover member placed over the carrier member.

FIG. 11 is a top plan view of an exemplary steel sleeve member 68 according to various aspects of the teachings of the present disclosure; and FIG. 12 is a bottom plan view of the sleeve member 68 of FIG. 11. FIG. 13 is a bottom plan view of the carrier member 52 of FIG. 10 including a sleeve member 68 aligned with and disposed on the ends 60 of the plurality of carrier legs 58. FIG. 14 is a bottom plan view of the assembly of FIG. 13, further including the cover member 54 placed over the carrier member 52.

With reference to each of FIGS. 11-14, the sleeve member 68 defines an inner perimeter 72 and an outer perimeter 74. The inner perimeter 72 may be shaped with certain areas having a radius of curvature in order to accommodate the pinions and other components. The outer perimeter 74 of the sleeve member 68 may be provided with an extending annular edge portion 104 that may provide additional strength and be used for welding to other components, such as a brake hub 70, as described above. A portion of the area 106 between the inner perimeter 72 and outer perimeter 74 may be used to secure the sleeve member 68 to the carrier legs 58, as shown in FIG. 5B. The inner perimeter 72 may also be shaped or stamped with cut-out portions 102 that may be configured as braze material retention features that cooperate with other components to form the braze material retention apertures 77. For example, the plurality of braze material retention features 102 cooperate with the carrier member 52 and the cover member 54, in the assembled state, as best shown in FIGS. 3B, 5A, 5B, and 14, to define retention apertures 77 shaped and sized to retain a braze material adjacent a single plane prior to a sintering process forming the braze joint 78 in the single plane. As shown in FIGS. 13 and 14, in certain aspects, at least two spaced-apart braze material retention features 102 may be provided per respective pair of aligned carrier leg and cover leg. The location and number of braze material retention apertures 77 may vary based on the design and strength requirements.

In still other aspects, the present teachings provide methods for assembling various types of planetary carrier assemblies 50. Although not limited to such a design, methods of the present technology may be used to assemble a two-component Ravigneaux carrier assembly. The methods may include forming the powder metal components, including the carrier member 52 and the cover member 54, with any desired features therein, as described above. The formation may include shaping and compressing the green powder metal components using suitable molds, as well as using forming rods, core rods, etc. The methods may then include aligning a powder metal carrier member 52 (including a carrier plate 56 having a plurality of integral carrier legs 58 extending therefrom) with a sleeve member 68 as shown in FIG. 13, and then aligning a powder metal cover member 54 (including a cover plate 62 having a plurality of integral cover legs 64 extending therefrom) with the carrier member 52 and the sleeve member 68 as shown in FIG. 14. In various aspects, the alignment may result in the respective ends 60 of the carrier legs 58 and ends 66 of the cover legs 68 being aligned with one another to form a subassembly similar to that best shown in FIGS. 2 and 5A.

In various aspects, the method includes disposing a braze material, such as a braze pellet 75, within a braze aperture 77 defined by the retention features 102 of the sleeve member 68 being aligned adjacent the respective ends 60, 66 of the carrier legs 58 and the cover legs 64. In other examples, either one or both of the carrier legs 58 or the cover legs 64 may be provided with a braze material retention aperture or bore (not shown). If a retention bore is provided in the legs, in may be necessary to flip the orientation of the assembly prior to sintering in order to induce the proper capillary action of the braze material. Once aligned, the method may include sintering the subassembly to form a braze joint 78 coupling the carrier member 52 to the sleeve member 68 and the cover member 54 in a single plane. In various aspects, the braze joint 78 may secure the respective legs 60, 66 of the carrier member 52 to the cover member 54 and the sleeve member 68, preferably in the single plane, via the braze joint 78. In certain aspects, other auxiliary components, such as a braze hub 70, or other component, may be welded to the sleeve member, as discussed above.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A planetary carrier assembly for a transmission, the carrier assembly comprising:
    a powder metal carrier member comprising a carrier plate including a plurality of carrier legs integral with and extending a distance from the carrier plate;
    a powder metal cover member comprising a cover plate having a plurality of cover legs integral with and extending a distance from the cover plate; and
    a steel sleeve member defining a plurality of braze material retention features along an inner perimeter of the sleeve member, the plurality of braze material retention features cooperating with the carrier member and the cover member, in an assembled state, to define retention apertures shaped and sized to retain a braze material prior to a sintering process,
    wherein the carrier assembly is arranged such that a portion of the carrier member is aligned with and brazed together with both a portion of the cover member and a portion of the sleeve member.

2. The planetary carrier assembly according to claim 1, wherein the sleeve member is stamped to define the plurality of braze material retention features.

3. The planetary carrier assembly according to claim 1, comprising at least two spaced-apart braze material retention apertures per respective pair of aligned carrier leg and cover leg.

4. The planetary carrier assembly according to claim 1, wherein respective ends of the carrier legs and ends of the cover legs are aligned and brazed to one another in a single plane.

5. The planetary carrier assembly according to claim 1, wherein a first portion of the carrier member is aligned with and brazed to a portion of the cover member, and a second portion of the carrier member is aligned with and brazed to a portion of the sleeve.

6. The planetary carrier assembly according to claim 1, wherein the carrier legs and the cover legs define respective inner walls and outer walls, and at least a portion of the inner walls of aligned carrier legs and cover legs are flush with one another in an assembled state.

7. The planetary carrier assembly according to claim 1, wherein the carrier assembly is arranged such that the portion of the carrier member is aligned with and brazed together with both the portion of the cover member and the portion of the sleeve member in a single plane.

8. A planetary carrier assembly for a transmission, the carrier assembly comprising:
    a powder metal carrier member comprising a carrier plate including a plurality of carrier legs integral with and extending a distance from the carrier plate;
    a powder metal cover member comprising a cover plate having a plurality of cover legs integral with and extending a distance from the cover plate;
    a steel sleeve member defining a plurality of braze material retention features along an inner perimeter of the sleeve member; and at least one auxiliary component secured to the carrier assembly, wherein the carrier assembly is arranged such that a portion of the carrier member is aligned with and brazed together with both a portion of the cover member and a portion of the sleeve member.

9. The planetary carrier assembly according claim 8, wherein the auxiliary component comprises a brake hub having an inner perimeter secured to an outer perimeter of the sleeve member.

10. A planetary carrier assembly for a transmission, the carrier assembly comprising:

a plurality of pinion gears;

a unitary, powder metal carrier member comprising a carrier plate having a plurality of integral carrier legs extending therefrom;

a unitary, powder metal cover member comprising a cover plate having a plurality of integral cover legs extending therefrom; and a steel sleeve member defining a plurality of braze material retention features along an inner perimeter of the sleeve member, wherein the braze material retention features of the sleeve member cooperate with the carrier member and the cover member, in an assembled state, to define a plurality of retention apertures shaped and sized to retain a braze material in place prior to a sintering process, further wherein the carrier assembly is arranged such that pairs of respective ends of the carrier legs and ends of the cover legs are brazed together and aligned with the sleeve member, defining an interior of the carrier assembly configured to house the plurality of pinion gears.

11. The planetary carrier assembly according to claim 10, comprising at least two spaced-apart retention apertures per respective pair of aligned carrier leg and cover leg.

12. The planetary carrier assembly according to claim 10, wherein the carrier legs and the cover legs define respective inner walls and outer walls, and the inner walls are substantially flush with one another in an assembled state.

13. The planetary carrier assembly according to claim 10, wherein the carrier assembly is arranged such that pairs of respective ends of the carrier legs and ends of the cover legs are brazed together and aligned with the sleeve member in a single plane.

14. A planetary carrier assembly for a transmission, the carrier assembly comprising:

a plurality of pinion gears;

a unitary, powder metal carrier member comprising a carrier plate having a plurality of integral carrier legs extending therefrom;

a unitary, powder metal cover member comprising a cover plate having a plurality of integral cover legs extending therefrom;

a steel sleeve member defining a plurality of braze material retention features along an inner perimeter of the sleeve member; and at least one auxiliary member, wherein the carrier assembly is arranged such that pairs of respective ends of the carrier legs and ends of the cover legs are brazed together and aligned with the sleeve member, defining an interior of the carrier assembly configured to house the plurality of pinion gears.

15. The planetary carrier assembly according to claim 14, wherein the auxiliary member comprises a brake hub welded to an outer perimeter of the sleeve member.

16. A method for assembling a planetary carrier assembly, the method comprising:

aligning: (1) a powder metal carrier member comprising a carrier plate having a plurality of carrier legs extending therefrom; (2) a sleeve member defining a plurality of braze material retention features along an inner perimeter of the sleeve member; and (3) a powder metal cover member comprising a cover plate having a plurality of cover legs extending therefrom, to form a subassembly with a portion of the carrier member, a portion of the cover member, and a portion of the sleeve member being aligned together;

disposing a braze material within a plurality of retention apertures adjacent the single plane;

sintering the subassembly and forming a plurality of braze joints between the carrier member and both the cover member and the sleeve member; and welding a brake hub to the sleeve member.

17. The method according to claim 16, comprising aligning the carrier member, the cover member, and the sleeve member such that respective ends of the carrier legs and ends of the cover legs are aligned with one another in a single plane.

18. The method according to claim 16, further comprising aligning and press-fitting an inner perimeter of the brake hub with an outer perimeter of the sleeve member prior to welding.

19. The method according to claim 16, wherein the plurality of retention apertures are formed by aligning the braze retention features of the sleeve member with the carrier member and the cover member to define the retention apertures shaped and sized to retain a braze material in place prior to sintering the subassembly.

* * * * *